R. BLUM.
CONVEYING APPARATUS.
APPLICATION FILED NOV. 22, 1904.

906,858.

Patented Dec. 15, 1908.
3 SHEETS—SHEET 1.

Witnesses:
Horace R. Crossman
Everett S. Emery

Inventor:
Richard Blum
by Emery, Booth & Varnell
Attys

R. BLUM.
CONVEYING APPARATUS.
APPLICATION FILED NOV. 22, 1904.

906,858.

Patented Dec. 15, 1908.
3 SHEETS—SHEET 2.

Witnesses:
Horace A. Crossman
Everett S. Emery

Inventor:
Richard Blum
by Emery, Booth & Varnell
Attys

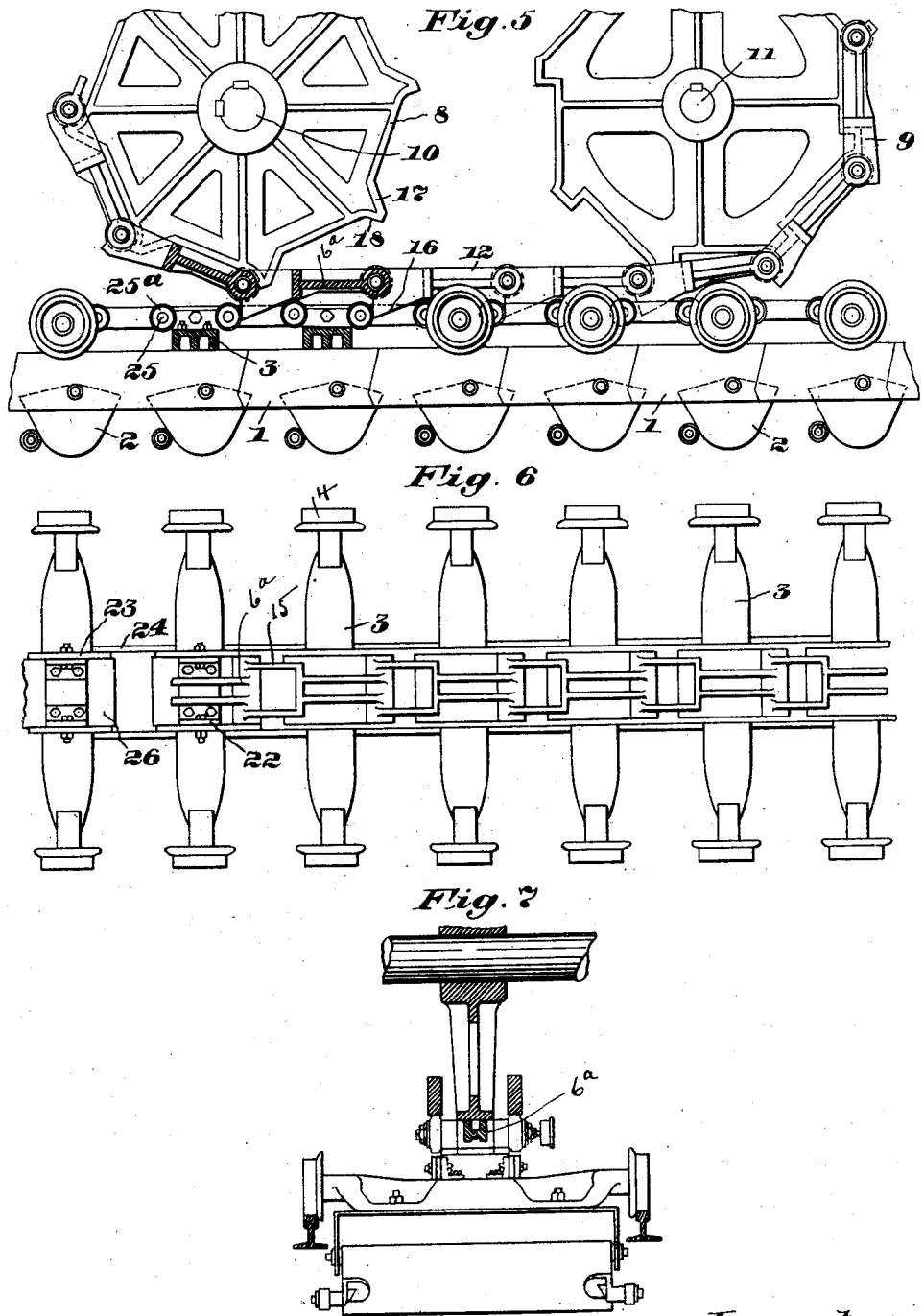

UNITED STATES PATENT OFFICE.

RICHARD BLUM, OF BERLIN, GERMANY.

CONVEYING APPARATUS.

No. 906,858.   Specification of Letters Patent.   Patented Dec. 15, 1908.

Application filed November 22, 1904. Serial No. 233,862.

*To all whom it may concern:*

Be it known that I, RICHARD BLUM, of Berlin, Germany, have invented an Improvement in Conveying Apparatus, of which the following description, in connection with the accompanying drawings, is a specification, like letters on the drawings representing like parts.

This invention relates to conveying apparatus, and particularly, though not exclusively, to the form of such apparatus shown in Letters Patent No. 630,805.

In the apparatus described in the patent referred to, motive power is imparted to the conveyer by means of a sprocket wheel, arranged adjacent the conveyer and engaging the axles upon which the conveyer elements are mounted. These axles are shown as connected by one or more cables, which form an endless band throughout the system.

The form of driving mechanism described above has been found defective for the reason that the more or less sharp deflection around the driving wheel, of the member connecting the conveyer elements, together with the fact that the driving power is imparted to but a very limited portion of the system, causes the connecting member to be subjected to severe flexing and tensile strain at substantially the same points, in consequence of which said member rapidly wears out and breaks. Furthermore, it is impracticable to use driving mechanism of the above description beneath the lower or loading run of the conveyer, where of necessity the conveyer elements must be maintained in alinement to properly receive and carry the material to be transported.

My invention, therefore, resides in means whereby the driving power may be applied to a conveyer without changing the course thereof, and also whereby said power may be distributed over a greater extent of the member connecting the successive elements of the conveyer.

The character and scope of the invention will be clearly apparent from a description, together with the claims appended thereto, of the particular embodiment illustrated in the accompanying drawings, in which,—

Figure 1:
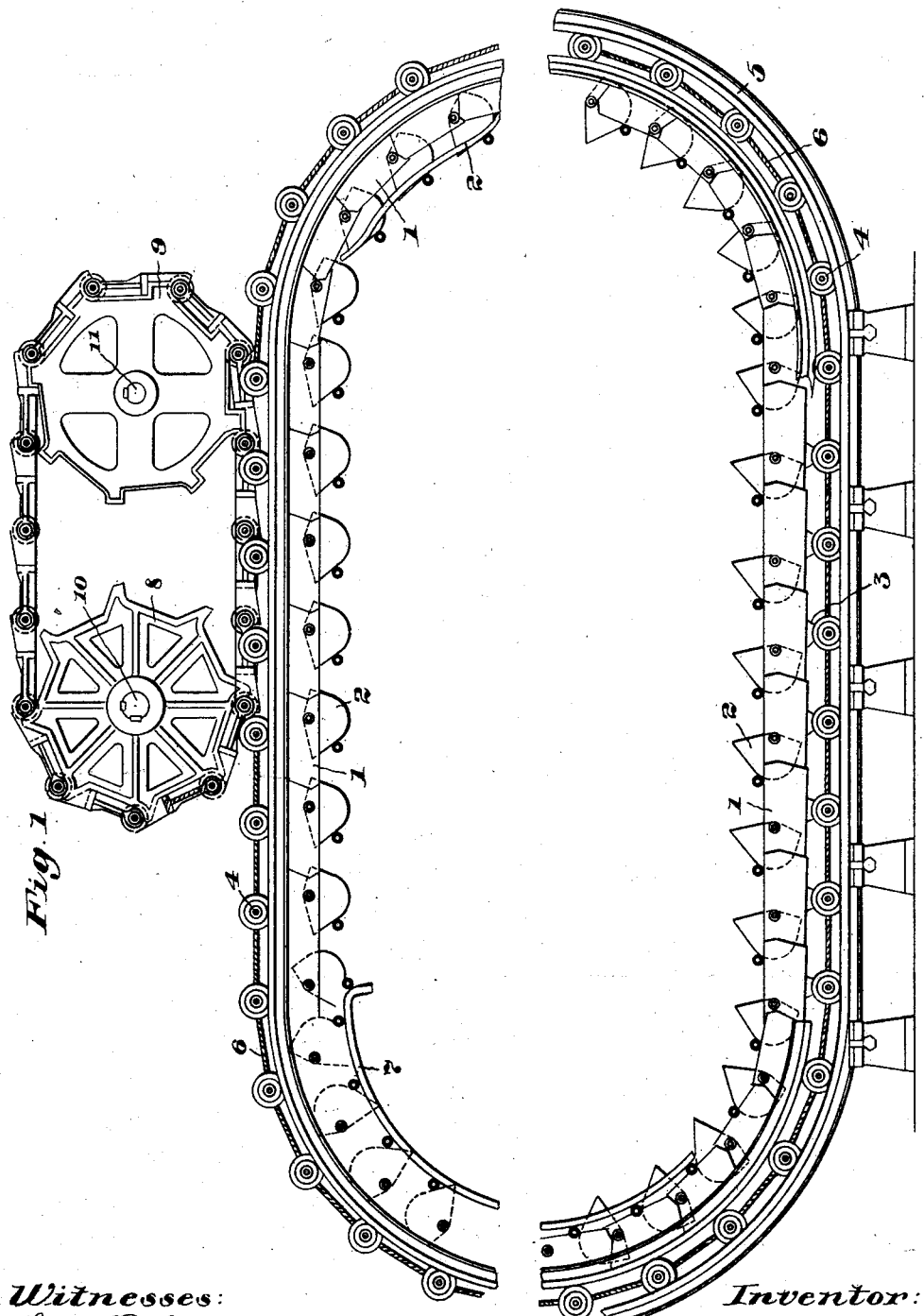
Figure 2:
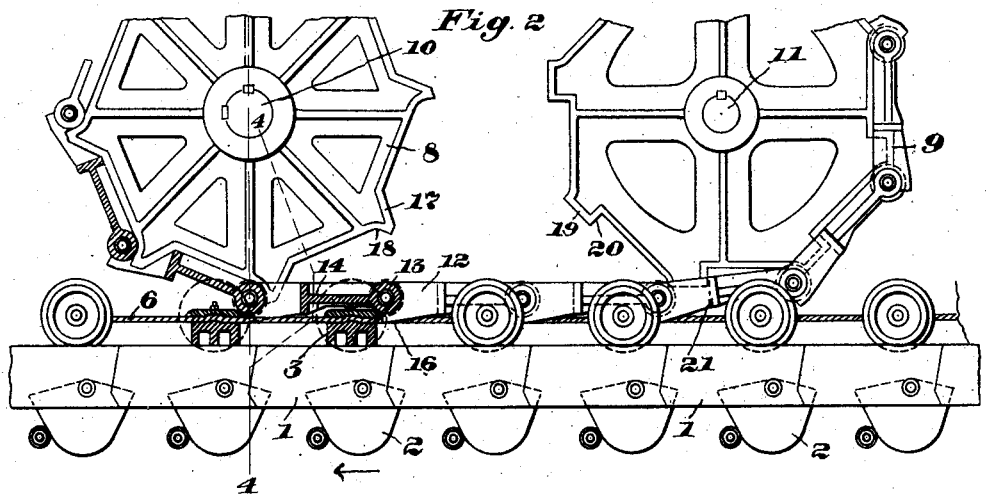
Figure 3:
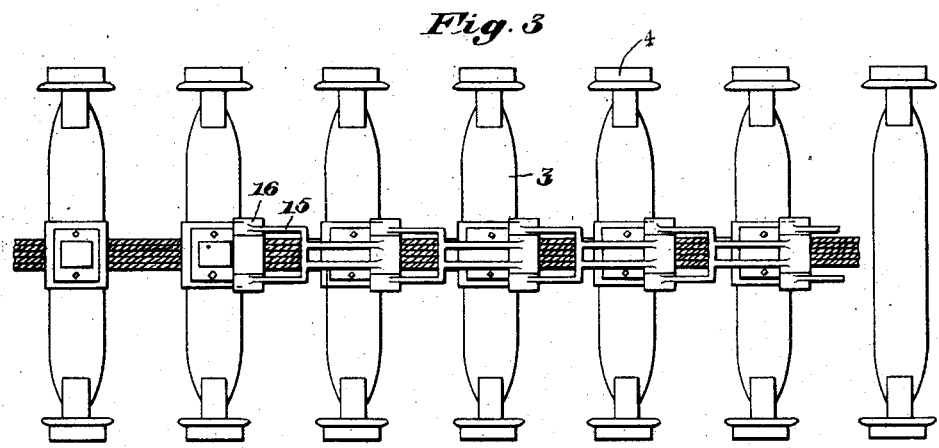
Figure 4:
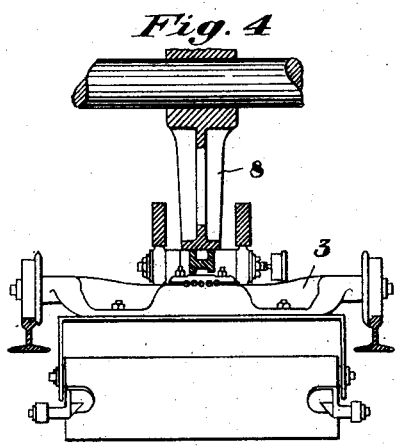

Figure 1 is a view of the general structure of the conveyer, parts being broken away to condense the illustration; Fig. 2 is a side elevation partly in section showing part of a cable connected conveyer with my invention applied thereto; Fig. 3 is a view in plan of the conveyer carrying and connecting mechanism, showing also a part of the driving mechanism; Fig. 4 is a sectional view on the line 4—4, Fig. 2, and, Figs. 5, 6 and 7 are views similar to 2, 3 and 4, respectively, of a conveyer having a single chain connection.

The form of conveyer employed for illustration in the drawings is in general such as that shown in the Letters Patent above referred to, and comprises a series of pan conveying elements, 1, to each of which is pivotally attached a swinging bucket conveying element, 2. The conveying elements 1 constitute material supporting elements and for that purpose may comprise, as indicated in Fig. 1, sections, each having a bottom and sides rising therefrom. The pan elements are provided with bearing axles, 3, having the bearing rollers, 4, which are adapted to travel upon a guiding track, 5. One or more cables, 6, are attached in suitable manner to the axles, 3, thus serving to unite the successive conveying elements which comprise the system. Suitable bucket tipping mechanism is provided, in the form of guides, 7, to control the positions of the conveying buckets at various portions of their travel.

The elements above described may be of any well-known construction, however, the form shown in the said Letters Patent being here selected merely for the purposes of illustration.

Referring to Figs. 2, 3 and 4, the improved driving mechanism in which my invention resides in part, consists of a pair of sprocket wheels, 8 and 9, mounted upon the shafts 10 and 11, respectively, to which shaft 10, driving power may be communicated in any suitable manner, as for instance, that shown in the patent referred to. Upon these sprocket wheels is mounted the driving member proper, consisting of the sprocket chain, 12, the links of which comprise the knuckle joints, 13, from which extend the preferably ribbed shanks, 14, which terminate in the forked members, 15, adapted to engage the joint 13 of the next succeeding link. Depending preferably from the forks, 15, of each of the links are the engaging lugs or power delivering projections, 16, which, in the form of construction illustrated in Figs. 2, and 3, are adapted to engage convenient portions of the axles, 3, of the conveyer members upon either side respectively, of the connecting cables, 6.

The sprocket wheel, 8, as illustrated in

Fig. 2, is provided with suitable sprocket teeth, 17, having faces, 18, which are shaped to engage snugly with the joints, 13, of the chain links between the arms of the forks, 15. The coöperating sprocket wheel, 9, is also provided with the sprocket teeth, 19, having shoulders, 20, adapted to engage cross ribs, 21, upon each of the driving links, whereby, in conjunction with the teeth of the sprocket wheel, 8, the portion of the driving chain between said wheels is held under proper tension to retain the driving section of the chain in a path parallel with and adjacent to the conveyer. By the described construction the links of the driving chain are snugly housed upon the sprocket wheels 8 and 9.

Inasmuch as a plurality of the lugged links of the driving chain simultaneously engage the conveyer, as indicated in Fig. 2, it is clear that driving power will be imparted to the latter over a considerable extent of its length; thus avoiding the objectionable features due to applying the driving power at a single point only.

In lieu of the cable connection, 6, illustrated in the first four figures of the drawing, a chain connection may be employed, such as that shown at 6ª in Figs. 5, 6 and 7. Either the cable 6 or the chain connection, shown in Figs. 5, 6 and 7, constitutes a flexible band. As shown in this construction, the chain may be connected with the elements of the conveyer, by attaching opposite links thereof to the bearing axles, by bolting the same to suitable angle irons, 22, which in turn are secured to the axle upon either side of that portion thereof to which formerly the cables were connected. Thus, it is evident that the single connecting chain construction may be made interchangeable with the cable connection above described. This connecting chain may be constructed in any suitable manner, but as here shown, comprises pairs of links, such as 23 and 24, united by suitable pivot pintles, 25, which carry anti-friction bushings 25ª, to receive the driving impulse of the lugs 16, of the driving chain 12.

While the driving mechanism herein described and shown, is illustrated as applied to a conveyer system, it is obvious it may be adapted and used in any other desired connection, and furthermore, many changes may be made in the details of construction and arrangement of parts without departing from the character and scope of the invention residing therein.

I claim—

1. The combination in a conveying apparatus of a conveyer comprising a series of flexibly connected material supporting and conveying elements, a plurality of sprocket wheels, a linked driving chain mounted upon and driven by said sprocket wheels and conforming to the path of and engaging with said conveyer at a plurality of points, each of said wheels having recessed portions between adjacent teeth, each portion receiving and snugly holding a link of said chain, whereby the links of the chain are snugly housed and the chain is held from movement in either direction.

2. The combination in a conveying apparatus of a conveyer comprising a series of flexibly connected material supporting and conveying elements, sprocket wheels 8 and 9 having teeth 17 and 19, the latter provided with shoulders 20, and a linked driving chain mounted upon said sprocket wheels, the pintles of said links being engaged by said teeth, the links of said chain having ribs 21 adapted to be engaged by said shoulders 20, whereby the portion of the driving chain between the wheels is held under proper tension.

3. The combination in a conveying apparatus of a conveyer comprising a series of flexibly connected material supporting and conveying elements, a pair of sprocket wheels 8 and 9, having teeth 17 and 19 provided with forward faces adapted snugly to engage the links of a chain, the teeth 19 having rear shoulders 20, and a linked chain mounted upon said sprocket wheels and conforming to the path of and engaging said conveyer at a plurality of points, the links of said chain having cross-ribs 21 engaging the shoulders 20.

4. The combination in a conveying apparatus of a conveyer comprising a series of flexibly connected material supporting and conveying elements, and a flexible driving connection conforming to the path of said conveyer, and having driving lugs 16 adapted to engage said conveyer within the confines of its upper and lower faces respectively.

5. The combination in a conveying apparatus of a conveyer comprising a series of flexibly connected material supporting and conveying elements, a plurality of sprocket wheels mounted above the upper run of said conveyer, and a linked chain mounted upon said sprocket wheels and having lugs engaging said conveyer between the upper and lower faces of the upper run thereof, said sprocket wheels being recessed between adjacent teeth, whereby a link may be received and snugly housed in each recess.

6. The combination in a conveying apparatus of a conveyer comprising a series of flexibly connected material supporting and conveying elements, a plurality of sprocket wheels mounted above the upper run of said conveyer, and a linked chain mounted upon said sprocket wheels and having lugs engaging said conveyer between the upper and lower faces of the upper run thereof, said sprocket wheels having teeth 17 and 19 provided with recessed forward faces snugly receiving the joints of the links, each link being received between adjacent teeth of said sprocket wheels.

7. The combination in a conveying apparatus of a conveyer comprising a series of flexibly connected material supporting and conveying elements, provided with bearing axles, said axles being provided with angle-irons and a linked chain connected to said bearing axles by means of said angle-irons, a plurality of sprocket wheels, a linked driving chain mounted thereon, and having lugs adapted to engage said bearing axles thereby to drive the conveyer without deflecting the same from its normal path.

8. The combination in a conveying apparatus of a conveyer comprising a series of flexibly connected material supporting and conveying elements, bearing axles 3 having provisions permitting the securing of a cable or chain links thereto, sprocket wheels 8 and 9 having teeth 17 and 19, and a linked chain mounted upon said sprocket wheels and having lugs 16 adapted to engage said bearing axles.

9. The combination in a conveying apparatus of a conveyer comprising a series of flexibly connected material supporting and conveying elements, provided with bearing axles, a flexible band connecting said axles, a plurality of sprocket wheels, and a linked chain mounted upon said sprocket wheels, the links of said chain each having a pair of oppositely disposed lugs adapted to engage the respective bearing axles at opposite sides of said flexible band.

10. The combination in a conveying apparatus of a conveyer comprising a series of flexibly connected material supporting and conveying elements, a plurality of sprocket wheels, a linked chain mounted upon said wheels and conforming to the path of said conveyer, each link of said chain comprising a knuckle joint 13, a shank 14 projecting therefrom, a forked member 15 and a driving lug 16 depending from said fork 15.

11. The combination in a conveying apparatus of a conveyer comprising a series of flexibly connected material supporting and conveying elements, a plurality of sprocket wheels, a linked chain mounted upon said wheels and conforming to the path of the conveyer, each link of said chain comprising a knuckle joint 13, a shank 14 projecting therefrom, a forked member 15 and a pair of opposed driving lugs 16 depending from opposite portions of the fork 15.

12. The combination in a conveying apparatus of a conveyer comprising a series of flexibly connected material supporting and conveying elements, a pair of sprocket wheels mounted above the upper run thereof, and having teeth 17 and 19, the latter having shoulders 20 and a linked driving chain mounted upon said wheels and adapted to engage said conveyer between the upper and lower faces thereof, each link having a knuckle joint, a shank extending therefrom, and a forked member 15 adapted to be penetrated by the teeth upon said sprocket wheels, and a pair of depending lugs 16 engaging said conveyer, as specified.

13. The combination in a conveying apparatus of a conveyer comprising a series of flexibly connected material supporting and conveying elements, provided with bearing axles, a flexible band connecting said axles, a plurality of sprocket wheels, and a linked chain mounted upon said sprocket wheels, said chain having a series of pairs of oppositely disposed lugs adapted to engage portions of said flexible conveyer at points on opposite sides of the longitudinal central line thereof.

14. The combination in a conveying apparatus of a conveyer comprising a series of flexibly connected material supporting and conveying elements, bearing axles 3 having provisions permitting the securing of a flexible band thereto, sprocket wheels 8 and 9 having teeth 17 and 19, and a linked chain mounted upon said sprocket wheels and having lugs 16 adapted to engage said bearing axles.

15. The combination in a conveying apparatus of a conveyer comprising a series of flexibly connected material supporting and conveying elements, a plurality of sprocket wheels mounted exterior to a run of said conveyer, and a linked chain mounted upon said sprocket wheels and having lugs engaging said conveyer between the upper and lower faces of said run thereof, said sprocket wheels having teeth 17 and 19 provided with forward faces snugly receiving the joints of the links, each link being received between adjacent teeth of said sprocket wheels.

16. The combination in a conveying apparatus of a conveyer comprising a series of flexibly connected material supporting and conveying elements, and a flexible connection conforming to the path of said conveyer and comprising connected links having driving lugs 16 adapted to engage said conveyer within the confines of its upper and lower faces respectively, said lugs 16 being at the leading ends of the links adjacent the pintles thereof.

17. The combination in a conveying apparatus of a conveyer comprising a series of flexibly connected material supporting and conveying elements, and a flexible connection conforming to the path of said conveyer and comprising connected links having driving lugs 16 adapted to engage said conveyer within the confines of its upper and lower faces respectively, said lugs projecting substantially less than the diameter of the links, from the body thereof, said conveyer and said flexible driving connection thereby being in close proximity where parallel.

18. The combination in a conveying apparatus of a conveyer comprising a series of flexibly connected material supporting and conveying elements, and a flexible driving connection conforming to the path of said conveyer and comprising a series of links having driving lugs 16 adapted to engage said conveyer within the confines of its upper and lower faces respectively, the leading or forward extremities of said lugs being disposed and formed to engage the conveyer to drive the same.

19. The combination in a conveying apparatus of a conveyer comprising a series of flexibly connected material supporting and conveying elements, a flexible band connected to and supported adjacent one face thereof, swinging conveying elements connected to said conveying elements adjacent the opposite face thereof, and a linked driving mechanism conforming to the path of said conveyer and having lugs engaging said conveyer between the upper and lower edges thereof and driving the same without deflecting said conveyer from its normal path.

20. The combination in a conveying apparatus of a series of flexibly connected material supporting and conveying elements having swinging conveying elements attached thereto, and driving mechanism conforming to path of and engaging said conveyer at a plurality of points.

21. The combination with a conveying apparatus comprising a series of flexibly connected material supporting and conveying elements having swinging conveying elements attached thereto, of driving mechanism conforming to the path of and engaging said conveyer at a plurality of points adjacent the connections between said conveying elements.

22. The combination in a conveying apparatus of a conveyer comprising a series of flexibly connected material supporting and conveying elements, and a flexible driving connection conforming to the path of said conveyer, and having driving lugs 16 adapted to engage said conveyer within the confines of its upper and lower faces respectively, the said conveyer comprising the said flexibly connected elements and the flexible driving connection being disposed in close proximity where parallel, so that short driving lugs upon said connection may be employed, the driving strain thereby being transmitted to the body of the connection, thus avoiding breakage of the lugs.

23. The combination in a conveying apparatus of a conveyer comprising a series of flexibly connected material supporting and conveying elements, and a flexible connection conforming to the path of said conveyer and comprising connected links having driving lugs 16 adapted to engage said conveyer within the confines of its upper and lower faces respectively, said lugs projecting very slightly beyond the surface of said links, said conveyer and said flexible driving connection being in close proximity where parallel.

24. The combination in a conveying apparatus of a conveyer comprising a series of flexibly connected material supporting and conveying elements, and a flexible driving connection conforming to the path of said conveyer, said driving connection being exterior to a run of the conveyer and in close proximity thereto where parallel therewith, said driving connection having lugs 16 adapted to engage said conveyer within the confines of its upper and lower faces respectively.

25. The combination in a conveying apparatus of a series of flexibly connected material supporting and conveying elements forming a continuous conveyer, each element thereof having a swinging conveying element attached thereto and driving mechanism conforming to the path of and engaging said conveyer at a plurality of points.

26. The combination in a conveying apparatus of a series of flexibly connected material supporting and conveying elements forming a continuous conveyer, each element thereof having a swinging conveying element atached thereto and driving mechanism for said conveyer conforming to the path thereof.

27. The combination in a conveying apparatus of one or more flexible bands, a series of conveying elements connected therewith, swinging conveying elements carried by the latter, and driving mechanism conforming to the path of said conveyer and engaging therewith at a plurality of points.

28. The combination in a conveying apparatus of a plurality of flexible bands, a series of conveying elements carried thereby forming a continuous conveyer, each element thereof having a swinging conveying element connected therewith, and driving mechanism conforming to the path of and engaging said conveyer at a plurality of points.

29. The combination in a conveying apparatus of one or more flexible bands each comprising flexibly connected links, a series of conveying elements connected therewith forming a continuous conveyer, swinging conveying elements carried by said elements, and driving mechanism conforming to the path of and engaging said conveyer at a plurality of points.

30. The combination in a conveying apparatus of articulated connecting members, pan conveyers connected therewith and together constituting a continuous conveyer, swinging conveyer elements carried thereby and coöperating therewith, and a driving mechanism engaging said articulated members at a plurality of points and conforming to the motion thereof, substantially as described.

31. In a conveying apparatus, a flexible band comprising articulated connecting members, conveyer elements carried thereby, and a driving mechanism having a driving chain located between the side edges of said conveyer elements and means to maintain the driving portion of said driving chain in a path parallel with and adjacent said articulated connecting members for moving the same.

32. In a conveyer, flexibly connected conveying elements and driving mechanism therefor, comprising means for distributing the power applied thereto, to said conveying elements at a plurality of points and between the side edges of said conveying elements and for maintaining said driving mechanism in a path parallel to said flexibly connected elements.

33. The combination in a conveying apparatus of a conveyer comprising a series of flexibly connected material supporting and conveying elements, and a linked driving chain conforming to the path of said conveyer, each link of said chain having a driving lug directly engaging the body of the conveyer.

34. The combination in a conveying apparatus of a conveyer comprising a series of flexibly connected material supporting and conveying elements, a flexible band connected to and supported adjacent one face thereof, swinging conveying elements connected to said conveying elements adjacent the opposite face thereof, and a linked driving mechanism conforming to the path of said conveyer and having lugs engaging said conveyer between the upper and lower edges thereof and driving the same without deflecting said conveyer from its normal path.

35. The combination in a conveying apparatus of a conveyer comprising a series of flexibly connected material supporting and conveying elements, provided with bearing axles, provisions permitting the securing of either links or cables to said bearing axles, a plurality of sprocket wheels, a linked driving chain mounted thereon, and having lugs adapted to engage said bearing axles, thereby to drive the conveyer without deflecting the same from its normal path.

In testimony whereof, I have signed my name to this specification, in the presence of two subscribing witnesses.

RICHARD BLUM.

Witnesses:
HENRY HASPER,
WOLDEMAR HAUPT.